(12) United States Patent
Davis

(10) Patent No.: US 10,240,473 B2
(45) Date of Patent: Mar. 26, 2019

(54) BIFURCATED SLIDING SEAL

(71) Applicant: UNITED TECHNOLOGIES CORPORATION, Hartford, CT (US)

(72) Inventor: Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 371 days.

(21) Appl. No.: 14/914,939

(22) PCT Filed: Aug. 26, 2014

(86) PCT No.: PCT/US2014/052744
§ 371 (c)(1),
(2) Date: Feb. 26, 2016

(87) PCT Pub. No.: WO2015/031384
PCT Pub. Date: Mar. 5, 2015

(65) Prior Publication Data
US 2016/0201493 A1    Jul. 14, 2016

Related U.S. Application Data

(60) Provisional application No. 61/872,268, filed on Aug. 30, 2013, provisional application No. 61/872,223, filed on Aug. 30, 2013.

(51) Int. Cl.
*F01D 11/00* (2006.01)
*F02C 7/28* (2006.01)
(Continued)

(52) U.S. Cl.
CPC ......... *F01D 11/005* (2013.01); *F01D 11/003* (2013.01); *F02C 7/28* (2013.01);
(Continued)

(58) Field of Classification Search
CPC ......... F01D 11/005; F02C 7/28; F16J 15/067; F05D 2220/32; F05D 2240/55
See application file for complete search history.

(56) References Cited

U.S. PATENT DOCUMENTS 2,544,538 A * 3/1951 Mahnken ................ F02K 1/822
126/39 M
2,941,825 A * 6/1960 Heinrich ................ F16J 15/363
277/368
(Continued)

FOREIGN PATENT DOCUMENTS

| EP | 1566581 A1 | 8/2005 |
| JP | 2001200938 A | 7/2001 |
| WO | 0012920 A1 | 3/2000 |

OTHER PUBLICATIONS

European Search Report for Application No. EP 14867717.
(Continued)

*Primary Examiner* — Eugene G Byrd
(74) *Attorney, Agent, or Firm* — Cantor Colburn LLP

(57) ABSTRACT

The present disclosure relates generally to a sliding seal between two components. The sliding seal includes a first seal section and an uncoupled second seal section which allows the first and second seal sections to move relative to one another during relative movement between the two components.

21 Claims, 6 Drawing Sheets

(51) Int. Cl.
*F16J 15/06* (2006.01)
*F16J 15/08* (2006.01)
*F16J 15/10* (2006.01)

(52) U.S. Cl.
CPC ......... *F16J 15/067* (2013.01); *F16J 15/0887* (2013.01); *F16J 15/104* (2013.01); *F05D 2220/32* (2013.01); *F05D 2240/55* (2013.01); *F05D 2260/38* (2013.01); *F05D 2300/176* (2013.01); *F05D 2300/6033* (2013.01); *Y02T 50/672* (2013.01)

(56) References Cited

U.S. PATENT DOCUMENTS

| | | | | |
|---|---|---|---|---|
| 3,893,786 | A * | 7/1975 | Rahnke | F01D 11/005 415/116 |
| 3,975,114 | A * | 8/1976 | Kalkbrenner | F01D 11/005 277/643 |
| 4,121,843 | A | 10/1978 | Halling | |
| 4,477,086 | A | 10/1984 | Feder | |
| 4,589,666 | A | 5/1986 | Halling | |
| 4,759,555 | A | 7/1988 | Halling | |
| 4,915,397 | A * | 4/1990 | Nicholson | F16J 15/0887 277/645 |
| 5,078,412 | A * | 1/1992 | Baumgarth | F02K 1/805 239/127.1 |
| 5,158,305 | A | 10/1992 | Halling | |
| 5,716,052 | A | 2/1998 | Swensen et al. | |
| 6,431,825 | B1 * | 8/2002 | McLean | F01D 11/005 277/644 |
| 6,702,549 | B2 * | 3/2004 | Tiemann | F01D 5/22 277/630 |
| 7,080,513 | B2 | 7/2006 | Reichert | |
| 7,163,206 | B2 * | 1/2007 | Cross | F02K 1/004 277/379 |
| 7,303,371 | B2 * | 12/2007 | Oltmanns | F01D 11/001 415/191 |
| 7,389,991 | B2 * | 6/2008 | Riggi, Jr. | F01D 11/00 277/500 |
| 7,497,443 | B1 * | 3/2009 | Steinetz | F16J 15/0887 277/644 |
| 7,954,823 | B2 | 6/2011 | Horie et al. | |
| 8,104,772 | B2 | 1/2012 | Halling | |
| 9,169,930 | B2 * | 10/2015 | Panchal | F16J 15/3284 |
| 9,341,072 | B2 * | 5/2016 | Hanumanthan | F01D 11/005 |
| 9,341,120 | B2 * | 5/2016 | Barry, Jr. | F02K 1/002 |
| 9,512,735 | B2 * | 12/2016 | Davis | F01D 11/005 |
| 9,790,809 | B2 * | 10/2017 | Dube | F01D 25/04 |
| 9,850,773 | B2 * | 12/2017 | Zelesky | F01D 11/005 |
| 2005/0008473 | A1 * | 1/2005 | Balsdon | F01D 11/005 415/110 |
| 2005/0082768 | A1 * | 4/2005 | Iguchi | F01D 11/005 277/591 |
| 2006/0038358 | A1 | 2/2006 | James | |
| 2006/0127219 | A1 * | 6/2006 | Zborovsky | F01D 9/023 415/229 |
| 2007/0297900 | A1 * | 12/2007 | Abgrall | F01D 5/225 415/209.3 |
| 2008/0258404 | A1 | 10/2008 | Pillhoefer | |
| 2009/0053055 | A1 * | 2/2009 | Cornett | F01D 11/005 415/208.2 |
| 2009/0322036 | A1 | 12/2009 | Halling | |
| 2011/0049812 | A1 | 3/2011 | Sutcu | |
| 2011/0058953 | A1 * | 3/2011 | Simon-Delgado | F01D 5/147 416/241 R |
| 2012/0235366 | A1 | 9/2012 | Walunj et al. | |

OTHER PUBLICATIONS

English Abstract for JP2001200938A—Jul. 27, 2001; 2 pgs.
English Abstract for WO0012920—Mar. 9, 2000; 1 pg.
International Search Report for Application No. PCT/US2014/052744; International Filing Date: Aug. 26, 2014; dated Dec. 11, 2014; 3 pgs.
International Search Report for International application No. PCT/US2014/052735; International filing date: Aug. 26, 2014; dated May 28, 2015; 3pgs.
International Written Opinion for International application PCT/US2014/052735; International Filing Date: Aug. 26, 2014; dated May 28, 2015; 9 pgs.
Written Opinion for International Application No. PCT/US2014/052744; International filing date: Aug. 26, 2014; dated Dec. 11, 2014; 10 pgs.

* cited by examiner

US 10,240,473 B2

BIFURCATED SLIDING SEAL

CROSS-REFERENCE TO RELATED APPLICATIONS

The present application claims the benefit of and incorporates by reference herein the disclosure of U.S. Ser. No. 61/872,268 filed Aug. 30, 2013 and U.S. Ser. No. 61/872,223 filed Aug. 30, 2013.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second components is disclosed, the seal comprising: a first seal section including a first base and a first leg extending from the first base; and a second seal section including a second base and a second leg extending from the second base; wherein the first and second seal sections are configured to sealingly engage with the first and second components; and wherein the first and second seal sections are configured to move relative to one another.

In another embodiment, a system is disclosed, comprising: a first component including a first surface; a second component including a second surface, the second component disposed adjacent the first component and defining a seal cavity therebetween; and a seal disposed in the seal cavity, the seal including: a first seal section; and a second seal section; wherein the first and second seal sections are configured to move relative to one another; wherein pressure within the seal cavity urges the seal to seat against the first surface and the second surface; and wherein relative movement of the first component and the second component toward or away from one another causes the first and second seal sections to slide relative to one another such that the seal is not substantially deflected.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
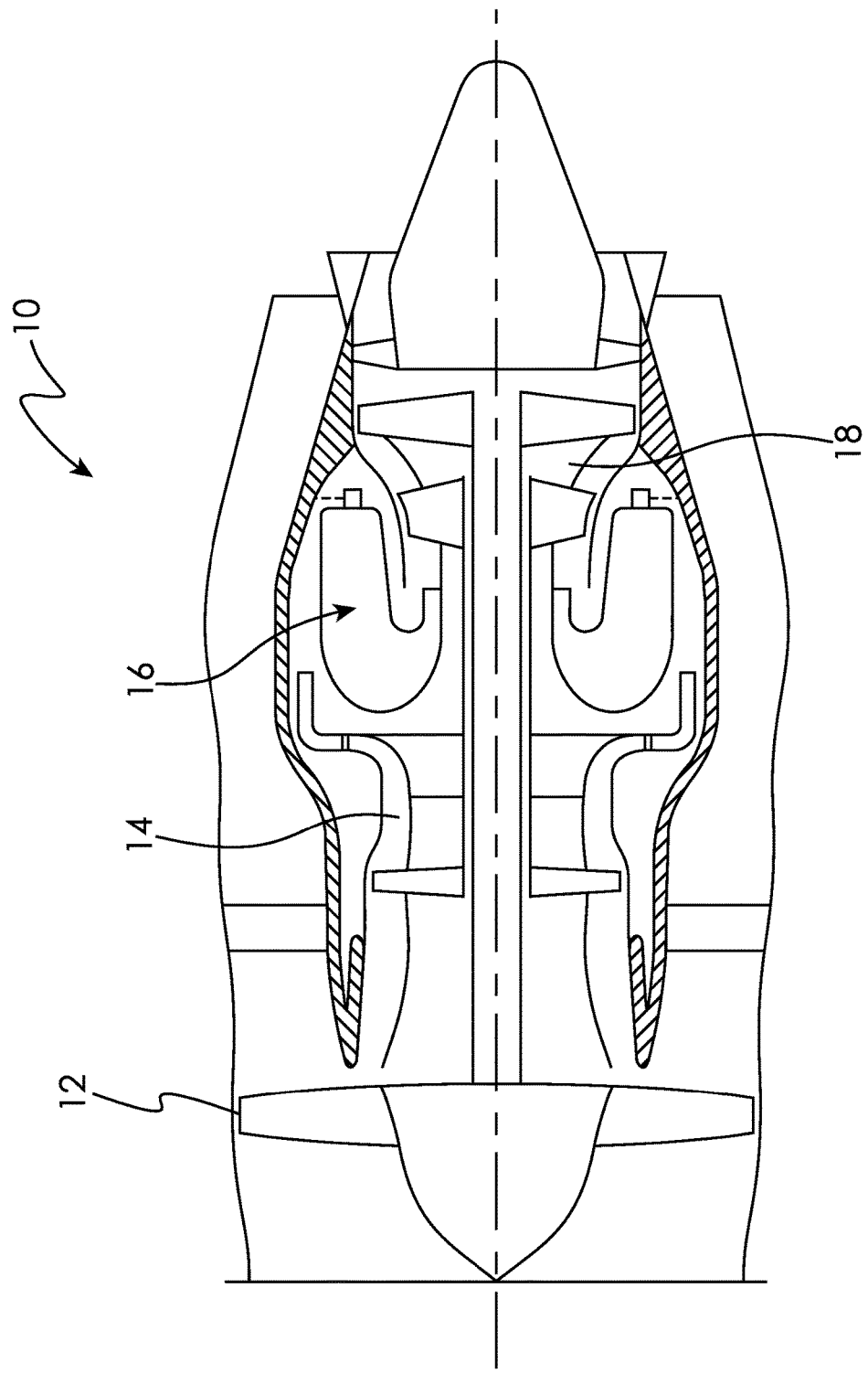
FIG. 1 is a schematic cross-sectional view of a gas turbine engine.

FIG. 1 illustrates a gas turbine engine 10 of a type normally provided for use in propulsion of aircraft or generation of electric power and bleed air, generally comprising in serial flow communication a fan 12 through which ambient air is propelled, a compressor section 14 for pressurizing a portion of the air (the gas path air), a combustor 16 in which the compressed air is mixed with fuel and ignited for generating a stream of hot combustion gases, and a turbine section 18 for extracting energy from the combustion gases.

Figure 2:
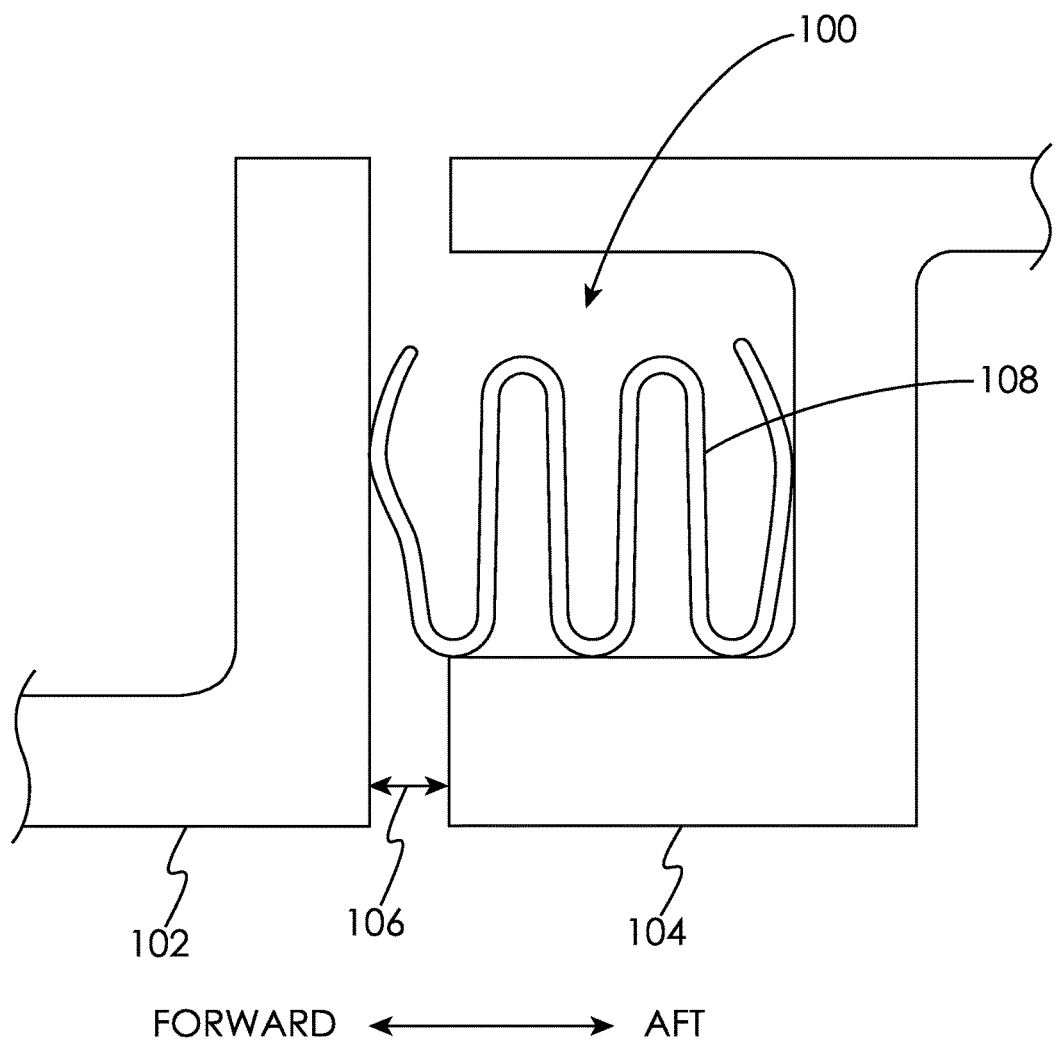
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. For example, the seals disclosed herein may be used to seal the circumferential space between a piston and a cylinder wall in which the piston reciprocates. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
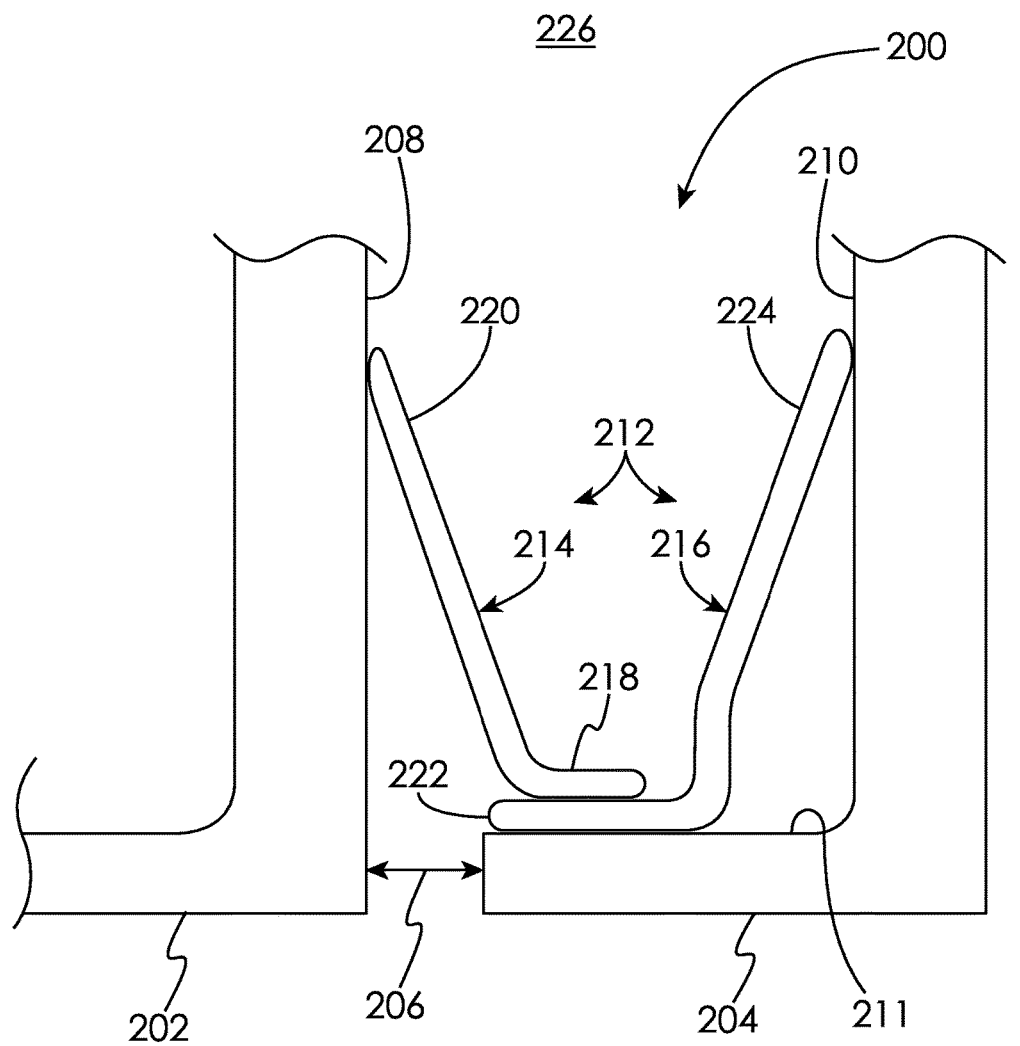
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. The seal 212 is formed from a first seal section 214 and a second seal section 216. The first seal section 214 includes a base 218 and a leg 220. The second seal section 216 includes a base 222 and a leg 224. The axis of each of the legs 220, 224 forms an angle of greater than 90° with the axis of each corresponding base 218, 220 such that the seal 212 is frustoconically shaped when viewed in cross-section as in FIG. 3. The seal 212 may include a coating and/or a sheath to provide increased wear resistance.

Pressure in a secondary flow cavity 226 is transmitted to the seal cavity 200 through an opening defined by the components 202, 204. This pressure acts upon the surfaces of the seal sections 214, 216, thereby causing the leg 220 to seat against the surface 208 of the component 202, the leg 224 to seat against the surface 210 of the component 204, and the base 218 to seat against the base 222. The load applied by base 218 to base 222 helps base 222 to seat against the surface 211, thereby providing a secondary seal against flow that may leak past the leg 224/surface 210 interface, such as during engine start-up, for example. This prevents most or all of the secondary flow cavity 226 gases from reaching the design clearance 206 area and flow path. As the two components 202 and 204 move relative to each other in the axial and/or radial direction, the seal sections 214, 216 are free to slide relative to one another in the axial and circumferential directions while the pressure forces acting upon the surfaces of the seal sections 214, 216 load the seal 212 so that it remains in contact with both components 202 and 204 as shown. Therefore, sealing is maintained while the components 202 and 204 and the components of the seal 212 move relative to one another. Because the seal sections 214, 216 slide with respect to one another and with respect to the components 202, 204, the seal 212 is not substantially deflected by the relative movement between the components 202 and 204.

Figure 4:
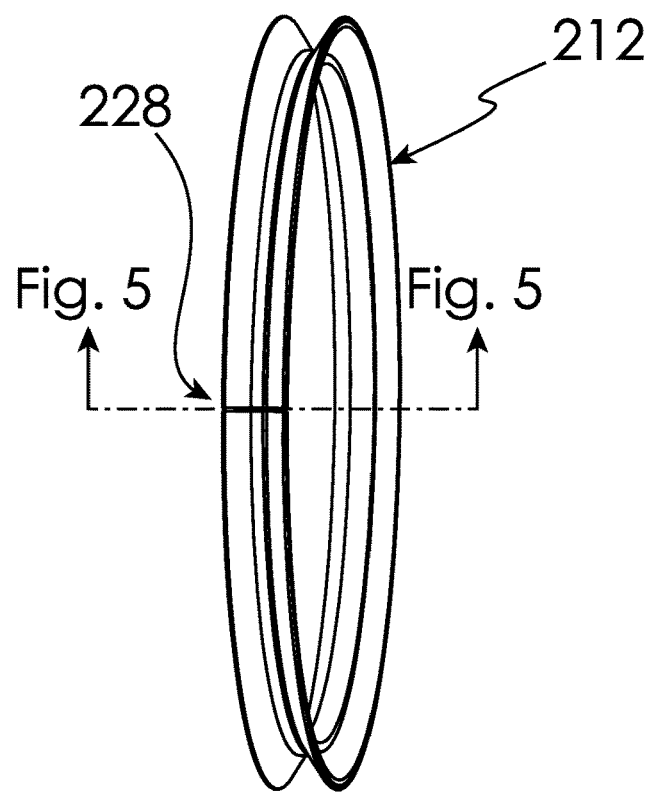
FIG. 4 is a schematic perspective view of a seal in an embodiment.
Figure 5:
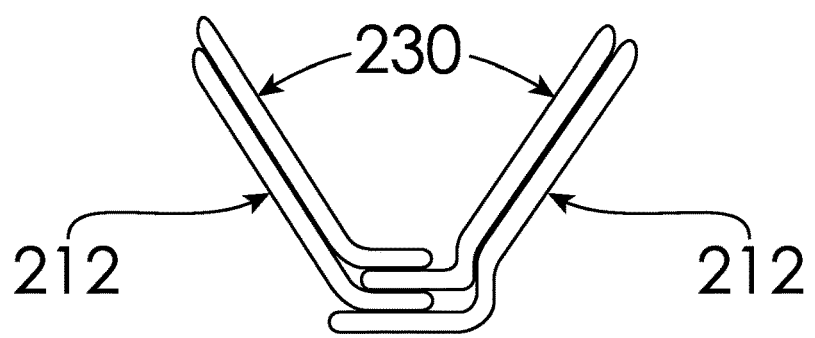
FIG. 5 is a schematic cross-sectional view of a seal and a bridging seal in an embodiment.

As shown in FIG. 4, the seal 212 may be formed as an annular hoop with a single split or gap 228 to enable seal sections 214, 216 and surface 211 to remain in radial contact as they expand and contract relative to one another. As shown in FIG. 5, the gap 228 may be covered by a bridging seal 230 that extends a distance on either side of the gap 228.

The pressure in the seal cavity 200 will act upon the bridging seal 230 to press it against the seal 212, thereby partially or substantially sealing the gap 228. In one embodiment, the gap formed in the seal section 214 is offset (e.g. circumferentially offset) from the gap formed in the seal section 216.

Unlike the seal 108, the seal 212 is not deflected as the components 202 and 204 move relative to each other during engine assembly and engine operation, which is beneficial because the seal 212 can be made from a lower strength material that may be lower cost, have higher temperature capability, be more manufacturable, and/or more wear-resistant. Additionally, the seal 212 is less susceptible to distortion or breakage, which can cause leakage of gas past the seal 212 and/or liberation of the seal. The seal 212 is also less complex/costly to produce, and the bridging seal 230 at the gap 228 will be more secure because the added stiffness of the bridging seal 230 does not impact seal functionality as it would with the seal 108 that must be deflected to seal properly.

Figure 6:
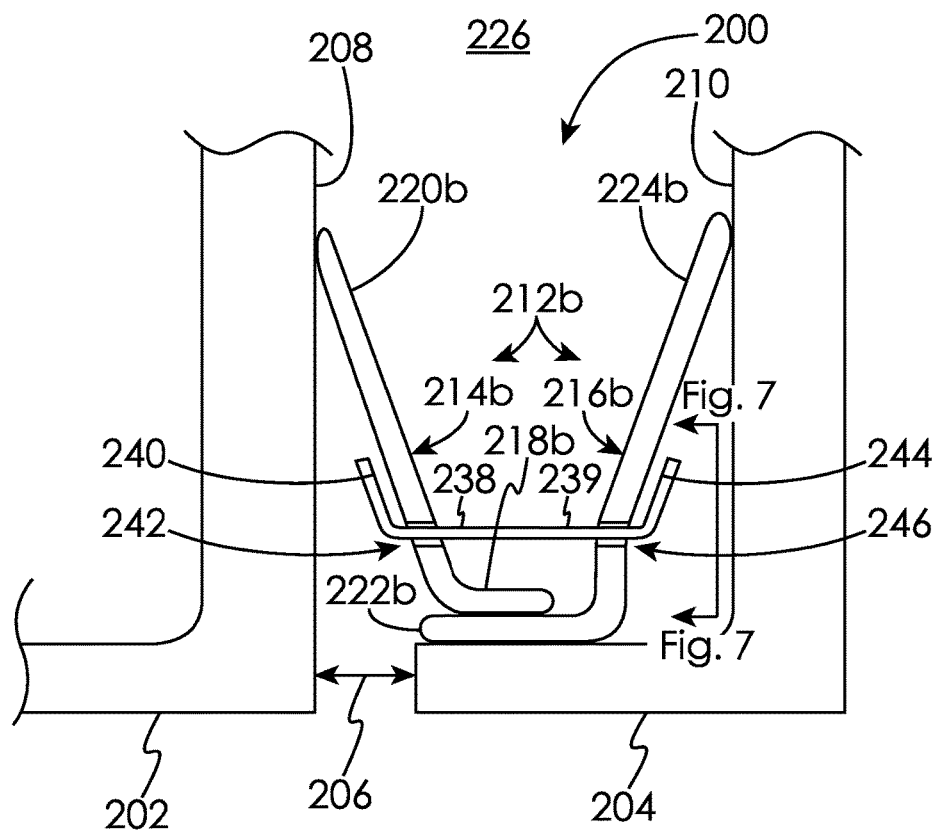
FIG. 6 is a schematic cross-sectional view of a seal and seal cavity in an embodiment.
Figure 7:
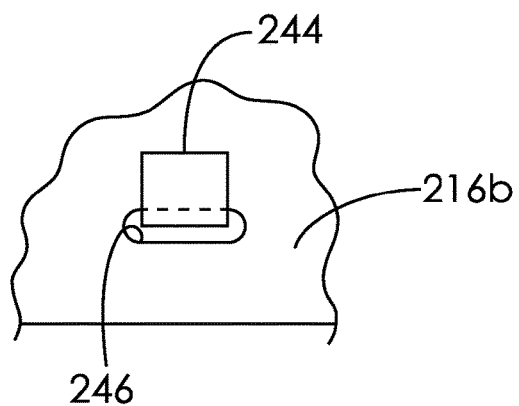
FIG. 7 is a schematic plan view of a portion of a seal in an embodiment.

In some embodiments, it may be desirable to limit the distance that seal sections 214, 216 may move relative to one another. FIG. 6 illustrates another embodiment of a seal 212 designated as 212b. Relative movement between the seal section 214b and the seal section 216b is limited by a tab 238 that has a tab body 239, a first tab end 240 that extends through an opening 242 in the seal section 214b, and a second tab end 244 that extends through an opening 246 in the seal section 216b. Tab ends 240, 244 form an angle relative to the tab body 239, thereby preventing the tab ends 240, 244 from disengaging the openings 242, 246. In one embodiment, the tab end 240 is substantially parallel to the leg 220b and the tab 244 is substantially parallel to the leg 224b. In some embodiments, the tab ends 240, 244 are bent in the opposite direction to that shown in FIG. 6. FIG. 7 is an elevational view of the tab 244 engaged with the opening 246.

Figure 8:
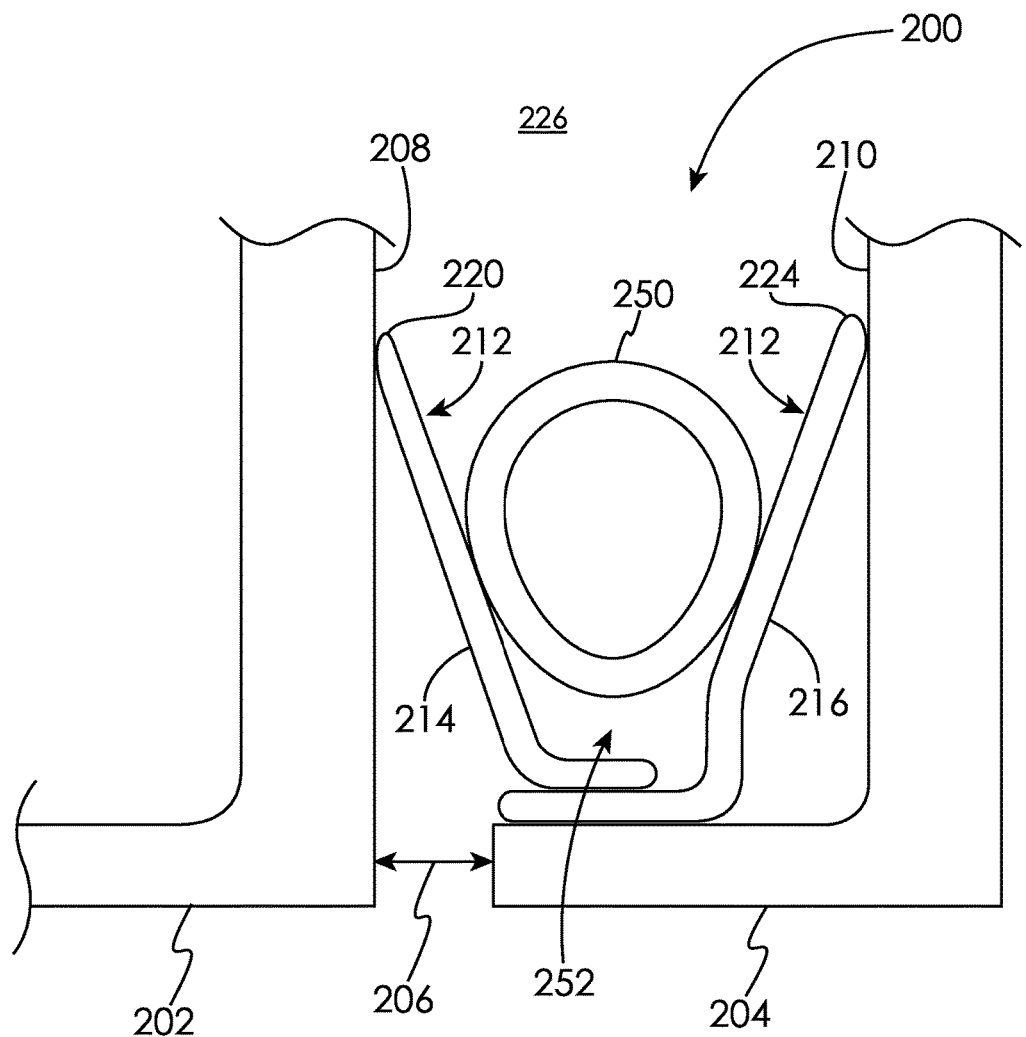
FIG. 8 is a schematic cross-sectional view of a seal, a rope seal and seal cavity in an embodiment.

FIG. 8 illustrates an embodiment in which a rope seal 250 is used in conjunction with the seal 212. The rope seal 250, which may be hollow in an embodiment to achieve a desired resilience, may be formed from a material appropriate to the anticipated operating conditions of the rope seal 250, such as a high-temperature ceramic fiber material, a high-temperature metal alloy, or a combination of the two to name just a few non-limiting examples. The rope seal 250 applies additional pressure to bias and thereby seat the legs 220, 224 against the walls 208, 210, respectively, to assist in building pressure above the seal 212 during start-up of the engine. The rope seal 250 may also provide additional sealing by creating a chamber 252 of reduced gas pressure, by helping legs 214 and 216 conform to walls 208 and 210, and/or by covering a portion of the gap 228 (FIG. 4). The rope seal 250 may be formed as a continuous annular seal, depending on its resilience in the circumferential direction. In one embodiment, the rope seal 250 may include a gap similar to the gap 228.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second components, the seal comprising:
   a first seal section including a first base and a first leg extending from the first base;

a second seal section including a second base and a second leg extending from the second base; wherein the first and second seal sections are configured to sealingly engage with the first and second components; wherein the first and second seal sections are configured to move relative to one another; and a tab including a tab body, a first tab end and a second tab end, wherein the first seal section defines a first opening, the second seal section defines a second opening, the first tab end is disposed in the first opening, and the second tab end is disposed in the second opening.

2. The seal of claim 1, wherein the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

3. The seal of claim 1, further comprising: a coating applied to at least a portion of each of the first and second seal sections.

4. The seal of claim 1, further comprising: a sheath covering at least a portion of each of the first and second seal sections.

5. The seal of claim 1, wherein: the first and second seal sections are substantially annular.

6. The seal of claim 5, wherein the first and second seal sections respectively define first and second gaps at respective opposed ends thereof.

7. The seal of claim 6, further comprising a bridging seal disposed adjacent the first and second seal sections and at least partially covering the first and second gaps.

8. The seal of claim 1, wherein the first and second seal sections together define a substantially frustoconical cross-section.

9. The seal of claim 1, wherein: the first tab end forms a first angle with the tab body; and the second tab end forms a second angle with the tab body.

10. The seal of claim 1, further comprising a rope seal disposed between the first and second seal legs.

11. The seal of claim 10, wherein the rope seal is annular.

12. The seal of claim 11, wherein the rope seal defines a gap at opposed ends thereof.

13. The seal of claim 1, wherein the first base is disposed adjacent the second base.

14. A system, comprising:
a first component including a first surface;
a second component including a second surface, the second component disposed adjacent the first component and defining a seal cavity therebetween; and
a seal disposed in the seal cavity, the seal including:
a first seal section; and a second seal section; wherein the first and second seal sections are configured to move relative to one another; wherein pressure within the seal cavity urges the seal to seat against the first surface and the second surface; and
wherein relative movement of the first component and the second component toward or away from one another causes the first and second seal sections to slide relative to one another such that the seal is not substantially deflected; and
a tab including a tab body, a first tab end and a second tab end, wherein the first seal section defines a first opening, the second seal section defines a second opening, the first tab end is disposed in the first opening, and the second tab end is disposed in the second opening.

15. The seal of claim 13, wherein: the first seal section includes a first base and a first leg extending from the first base; and the second seal section includes a second base and a second leg extending from the second base.

16. The seal of claim 15, wherein the first base is disposed adjacent the second base.

17. The seal of claim 14, wherein the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

18. The seal of claim 14, wherein: the first and second seal sections are substantially annular.

19. The seal of claim 18, wherein the first and second seal sections respectively define first and second gaps at respective opposed ends thereof.

20. The seal of claim 19, further comprising a bridging seal disposed adjacent the first and second seal sections and at least partially covering the first and second gaps.

21. The seal of claim 14, further comprising a rope seal disposed between the first and second seal legs.

* * * * *